Dec. 18, 1923.
E. H. LICHTENBERG
1,477,571
TRACTOR
Original Filed Feb. 26, 1919    2 Sheets-Sheet 1
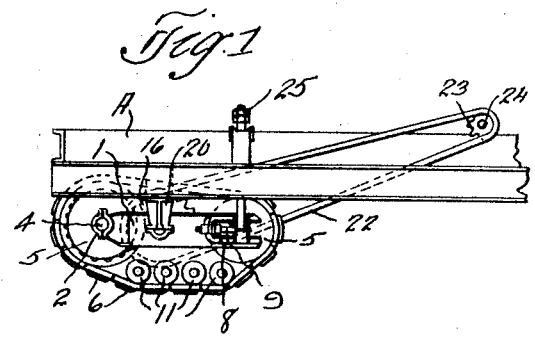
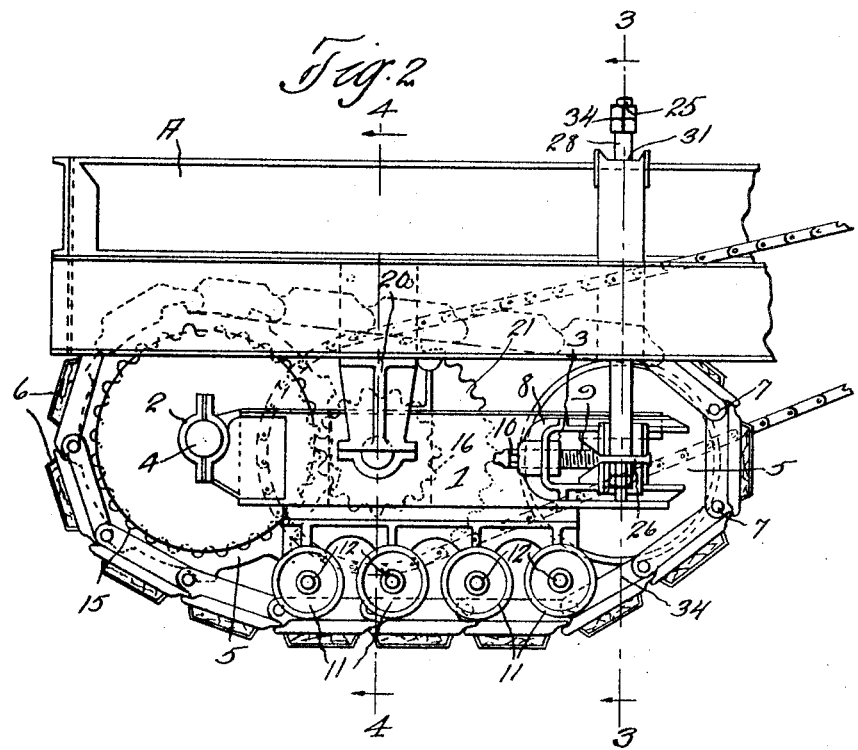
Inventor
E. H. Lichtenberg
By Robb, Robb + Hill
Attys.

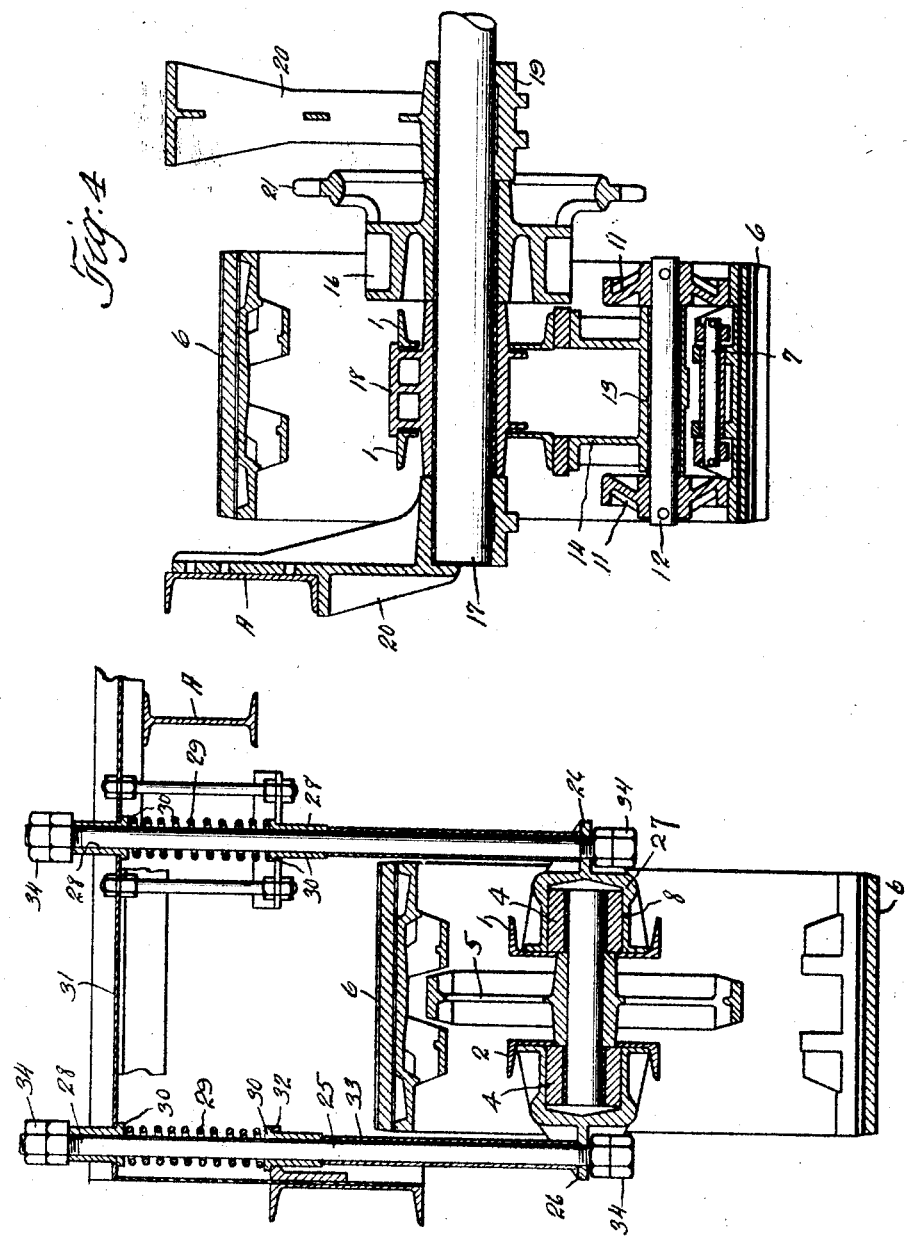

Patented Dec. 18, 1923.

1,477,571

UNITED STATES PATENT OFFICE.

ERICH H. LICHTENBERG, OF MILWAUKEE, WISCONSIN, ASSIGNOR, BY MESNE ASSIGNMENTS, TO KOEHRING COMPANY, OF MILWAUKEE, WISCONSIN, A CORPORATION OF WISCONSIN.

TRACTOR.

Original application filed February 26, 1919, Serial No. 279,235. Divided and this application filed January 28, 1920. Serial No. 354,546.

*To all whom it may concern:*

Be it known that I, ERICH H. LICHTENBERG, a citizen of the United States, residing at Milwaukee, in the county of Milwaukee and State of Wisconsin, have invented certain new and useful Improvements in Tractors, of which the following is a specification, the same being a division of my copending application for patent for traction grading machine, Serial No. 279,235, filed February 26, 1919.

The present invention relates to tractor devices, and has for its object to provide a device of this character which embodies novel features of construction whereby it can be used for the support of a heavy superposed load and will not "dig in" when encountering soft places in the surface of the ground over which the tractor is moving.
The tractor has been more particularly designed for utilization in connection with traction grading machines where any tendency of the tractor to "dig in" would be very objectionable, although it will be obvious that the usefulness of the tractor construction is not restricted to any particular type of machines or mechanism.

Further objects of the invention are to provide a traction device which has a strong and durable construction, which will support a heavy superposed load, which is powerful in its action, and which has the necessary movement relative to the superposed load for adjusting itself to uneven ness or inequalities in the surface of the ground over which the tractor is moving although the tractor is mounted and driven in such a manner that there is no tendency of the tread to "dig in" when a soft place is encountered in the surface of the ground.

For a full understanding of the invention reference is to be had to the following description and accompanying drawings which illustrate one of many possible em bodiments of the idea involved, and in which:

Figure 1 is a diagrammatic view and shows a traction device of the type embodying the invention operatively mounted under a frame upon which the load to be carried is superposed.

Figure 2 is an enlarged side elevation of the traction device, showing more clearly the construction and manner of mounting thereof.

Figure 3 is a transverse sectional view on the line 3—3 of Figure 2.

Figure 4 is a similar view on line 4—4 of Figure 2.

Corresponding and like parts are referred to in the following description and indicated in all of the views of the drawings by the same reference characters.

Referring to the drawings, which illustrate one possible embodiment of the invention, the numerals 1 designate the spaced side channels of the frame, the opposite ends of the side channels being provided with the respective bearings 2 and 3 within which the transverse shafts 4 are journaled. These shafts carry the rollers or drums 5 around which the endless tread passes, said tread being of some suitable and known construction, and being shown as composed of a series of tread sections 6 which are pivotally connected at 7. The bearings 3 for the rear shaft 4 are preferably adjustably mounted so that they can be moved to take up any looseness in the articulated tread. As illustrated the rear ends of the side channels 1 are bifurcated or slotted at 8 to receive the bearings 3, said bearings being slidable within the bifurcations and being operatively engaged by adjusting bolts 9. Nuts 10 are applied to these adjusting bolts 9 and provide a means for locking the same in an adjusted position.

The lower stretch of the articulated tread is in direct engagement with the surface of the ground over which the traction device is traveling, and is supported at the top thereof by a series of rollers 11. These rollers 11 are arranged in pairs which are connected by transverse shafts 12. These shafts are journaled in bearings 13 provided in a bearing block 14 which is arranged under the side channels 1 and carried thereby. The rollers 11 engage edge portions of the tread section 6 and hold the same in proper position.

The forward shaft 4 is provided with a gear wheel 15 which meshes with a smaller gear 16 on a load supporting shaft 17 which extends transversely across the caterpillar frame at an intermediate point in the length thereof. This shaft 17 is shown as journaled within a bearing block 18 fitted between the side channels 1, the ends of the shaft projecting laterally from opposite sides of the tractor and being received within bearings 19 at the lower ends of brackets or hangers 20 which are pendant from the superposed frame A upon which the load to be carried is placed. A sprocket wheel 21 is operatively connected with the gear wheel 16, being shown in the present instance as rigid therewith. This sprocket wheel receives power from some suitable source for driving the tractor device and, for this purpose, a chain 22 is shown as connecting the said sprocket wheel to a sprocket 23 on a drive shaft 24 which is journaled on the main frame A and may receive power from any source. There will, of course, be a tendency for the entire tractor device to rotate bodily about the shaft 17 and, owing to the arrangement of the driving gear this will result in a tendency to lift or elevate the nose of the traction device and prevent it from "digging in."

The rear end of the frame is provided with a pair of plungers 25 which extend upwardly on opposite sides of the tractor and have a yielding engagement with the main frame A. The lower ends of the plungers 25 pass loosely through openings in outstanding flanges 26 projecting from yokes 27 which span the bifurcations 8 of the side channels 1. The upper ends of the plungers 25 are each slidably received within a pair of guide collars 28 which have a coil spring 29 interposed between the same. These springs surround the respective plungers 25 and engage flanges 30 at the ends of the guide collars. The upper set of guide collars 28 are slidable within openings provided in a plate 31 on the main frame A, the flanges 30 engaging the lower face of the plate to prevent upward movement of the guide collars through the plate, although the collars can have a limited downward movement against the action of the springs 29. The lower set of guide collars 28 are slidably received within openings provided in brackets 32 which are arranged under the plate 31. The flanges 30 of the lower set of guide collars 28 engage the upper faces of the brackets 32 to prevent downward movement of the guide collars therethrough although the guide collars can move upwardly against the action of the springs 29. Sleeves 33 are fitted upon the lower ends of the plungers 25 and interposed between the lower set of guide collars 28 and the outstanding flanges 26 of the tractor frame, and the extremities of the plungers 25 are capped by the nuts 34.

With the construction which has just been described it will be obvious that the rear end of the frame is normally held yieldingly in the correct position for movement over level or smooth road surfaces. However, the tractor frame has a limited rocking movement about the load supporting shaft 17 so that the tractor can adjust itself to inequalities in the surface of the ground over which it is traveling. In other words, the rear end portion of the frame is held yieldingly at its proper position for ordinary operation by means of the spring plungers which connect the frame to the main frame, although the caterpillar is adapted to rock bodily upon the shaft 17 as an axis for the purpose of accommodating itself to variations in the surface of the ground over which it travels. The manner of mounting and driving the tractor device is such that it will not have a tendency to "dig in" when a soft place is encountered in the surface of the ground, and heavy loads can be carried and properly supported without difficulty. This is due to the fact that when the machine is moving forward the direction of rotation of the driving gear is such that the tendency of the entire tractor to rotate therewith will tend to swing the forward end of the tractor upwardly and elevate the same. This feature of construction is especially advantageous in connection with traction grading machines of the general character described in my previously mentioned co-pending application, since any "digging in" of the supporting tractor would necessarily interfere with the proper grading action of the machine.

While I have specifically described one particular embodiment of the caterpillar traction device, it will be obvious that it is susceptible of many modifications and changes without departing from the spirit of the invention.

Having thus described my invention what I claim as new is:

1. A traction device, comprising a frame, an endless tread operating on said frame, a transversely disposed load supporting shaft engaging an intermediate portion of the frame and about the axis of which the frame is adapted to rock, a drive wheel loosely mounted on the said load supporting shaft, a drive connection between the drive wheel and the endless tread, and means for applying power to the drive wheel, said drive wheel rotating in such a direction as to tend to lift an end portion of the frame.

2. A traction device, comprising a frame, an endless tread on said frame, a transversely disposed load supporting shaft engaging an intermediate portion of the frame and about the axis of which the frame is adapted to rock, a drive wheel loosely mounted on the said shaft, means for applying power to the drive wheel, a gear rigid with the drive wheel, and a drive connection between the gear and the endless tread, the drive wheel rotating in such a direction as to tend to lift the forward end of the frame.

3. A device, comprising a frame, front and rear drums thereon, an endless tread extending around the said drums, a transversely disposed load supporting shaft engaging an intermediate portion of the frame and about the axis of which the frame is adapted to rock, a drive wheel loosely mounted on the said shaft, a gear rigid with the drive wheel, and a gear rigid with the front drum and meshing with the said gear of the drive wheel, the drive wheel rotating in such a direction as to tend to lift the forward end of the frame.

In testimony whereof I affix my signature.

ERICH H. LICHTENBERG.